(12) United States Patent
Stevens et al.

(10) Patent No.: US 7,899,833 B2
(45) Date of Patent: Mar. 1, 2011

(54) MANAGING RELATED DATA OBJECTS

(75) Inventors: Daniell Stevens, Watertown, MA (US);
Donald Beaudry, Belmont, MA (US)

(73) Assignee: Ab Initio Technology LLC, Lexington, MA (US)

( * ) Notice: Subject to any disclaimer, the term of this patent is extended or adjusted under 35 U.S.C. 154(b) by 533 days.

(21) Appl. No.: 10/979,742

(22) Filed: Nov. 2, 2004

(65) Prior Publication Data

US 2006/0095466 A1 May 4, 2006

(51) Int. Cl.
*G06F 17/30* (2006.01)
(52) U.S. Cl. .......................................... 707/754
(58) Field of Classification Search ........................ None
See application file for complete search history.

(56) References Cited

U.S. PATENT DOCUMENTS

| | | | | |
|---|---|---|---|---|
| 5,596,746 A | * | 1/1997 | Shen et al. | 707/101 |
| 5,701,453 A | * | 12/1997 | Maloney et al. | 707/2 |
| 5,734,886 A | * | 3/1998 | Grosse et al. | 707/4 |
| 6,609,132 B1 | * | 8/2003 | White et al. | 707/103 R |
| 2005/0257193 A1 | * | 11/2005 | Falk et al. | 717/109 |

OTHER PUBLICATIONS

PCT International Search Report and Written Opinion dated Feb. 19, 2008. International Application No. PCT/US05/39425, 11 pages.

\* cited by examiner

*Primary Examiner* — Tony Mahmoudi
*Assistant Examiner* — Michele C Choi
(74) *Attorney, Agent, or Firm* — Fish & Richardson P.C.

(57) ABSTRACT

Information related to a first set of one or more data objects of a plurality of data objects in a database is determined. A composition of one or more actions is applied to determine the information related to the first set of one or more data objects. At least one of the actions includes a navigation action that maps a set of data objects to another set of data objects related according to a relationship type determined from a specification of the navigation action. Applying the composition of one or more actions may include recursive application of the navigation action. The actions may include a second action that performs a function based values associated with the data objects returned by the navigation action, where each value represents an attribute of the associated data object.

31 Claims, 4 Drawing Sheets

MANAGING RELATED DATA OBJECTS

BACKGROUND

The invention relates to managing and providing an interface to related data objects.

Data in a storage device is typically organized according to a file system. A file system typically organizes data (e.g., files) in a hierarchy of directories that can each contain a group of files and/or other directories. The hierarchy of directories can be navigated using a path that implicitly or explicitly identifies a starting location and identifies one or more files and/or directories relative to the starting location.

A file system hierarchy can be represented as a tree of nodes, where a directory is a node with a branch for each item in the directory and a file is a leaf node. A branch between a node and its child represents a "contained in" relationship between the nodes. A path can include expressions including wildcards that filter a set of selected nodes.

Other data systems can be used to navigate a tree structured hierarchy of data objects. For example, Xpath can be used to navigate among portions of an XML document. XPath models an XML document as a tree of nodes. There are different types of nodes, including element nodes, attribute nodes and text nodes, that are related in a hierarchical structure.

One type of expression that is used for navigation in Xpath is a location path. A location path selects a set of nodes relative to a context node. The result of evaluating a location path is a set of nodes selected by the location path. Location paths can also include expressions that are used to filter a selected set of nodes.

SUMMARY

In a general aspect, the invention features a method and corresponding software and a system for determining information related to a first set of one or more data objects of a plurality of data objects in a database. A composition of one or more actions is applied to determine the information related to the first set of one or more data objects. At least one of the actions includes a navigation action that maps a set of data objects to another set of data objects related according to a relationship type determined from a specification of the navigation action.

Aspects of the invention can include one or more of the following features:

Applying the composition of one or more actions includes recursive application of the navigation action. Recursive application of the navigation action can include recursive application of a composition of navigation actions that includes the navigation action. Applying the composition of one or more actions can include identifying data objects found in the recursive application of the navigation action, and/or identifying data objects found at the end of the recursive application of the navigation action.

A specification of a visual representation of information about data objects in the database is accepted. The specification includes a specification of the composition of one or more actions. The visual representation including the information related to the first set of one or more data objects is presented to a user.

The specification of the navigation action includes a function whose arguments include a category of data objects and a name of an annotation rule specifying the relationship type.

The actions include a second action that performs a function based on values associated with the data objects returned by the navigation action, where each value represents an attribute of the associated data object. The function can include filtering the returned set of data objects based on the values to generate a subset of the returned set, sorting the returned set of data objects, an arithmetic function of at least some of the values, and/or a logical function of at least some of the values.

The relationship type corresponds to one of multiple relationship types, such as categories of data objects.

The relationship type identifies a value associated with a first data object that refers to a value associated with a second data object The first data object is in a first category and the second data object is in a second category.

The value associated with the first data object is a foreign-key and the value associated with the second data object is a primary-key.

Aspects of the invention can include one or more of the following advantages:

The techniques described herein enable navigation among data objects in a database (an object oriented relational database) that are potentially related by multiple types of relationships (e.g., multiple types of primary-key/foreign-key relationships). When a specification of a navigation action determines a relationship type, the navigation action can be used to locate a set of data objects related according to that relationship type. Recursive application of a navigation action enables greater flexibility in locating related data objects. The ability to perform a function based attribute values associated with data objects also enables greater flexibility in extracting desired information from the database.

Other features and advantages of the invention will become apparent from the following description, and from the claims.

DESCRIPTION

1 Overview

1.1 System

Figure 1A:
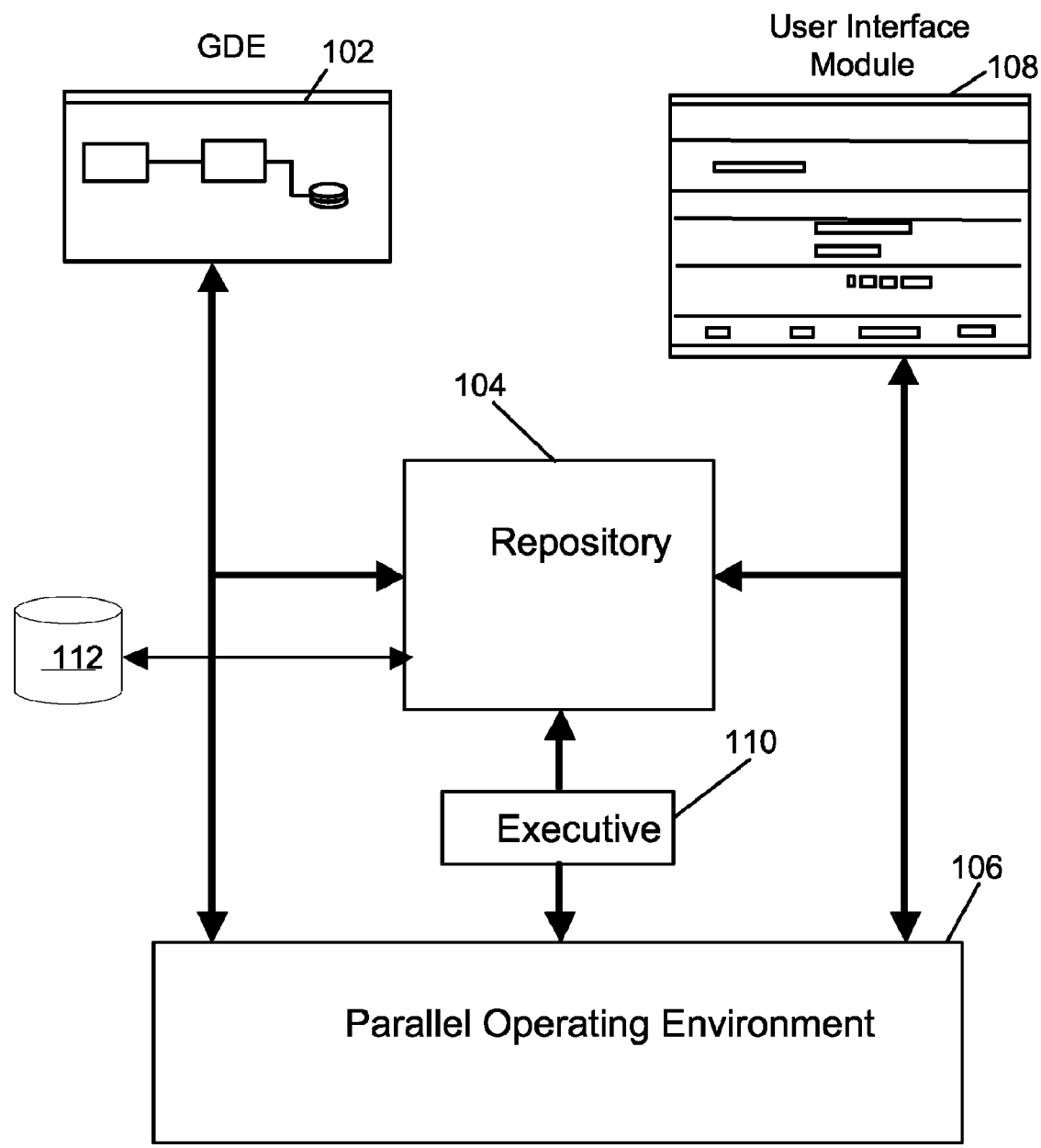
FIG. 1A is a block diagram of a computing system.

FIG. 1A is a block diagram showing the interrelationship of parts of a computing system 100 for developing, executing and managing graph-based computations. A graph-based computation is implemented using a "data flow graph" that is represented by a directed graph, with vertices in the graph representing components (either data files or processes), and the directed links or "edges" in the graph representing flows of data between components. A graphic development environment (GDE) 102 provides a user interface for specifying executable graphs and defining parameters for the graph components. The GDE may be, for example, the CO>OPERATING SYSTEM® GDE available from the assignee of the present invention. The GDE 102 communicates with a repository 104 and a parallel operating environment 106. Also coupled to the repository 104 and the parallel operating environment 106 are a User Interface module 108 and an executive 110.

The repository 104 preferably is a scalable object-oriented database system designed to support the development and execution of graph-based applications and the interchange of metadata between the graph-based applications and other systems (e.g., other operating systems). The repository 104 is a storage system for all kinds of metadata, including documentation, record formats (e.g., fields and data types of records in a table), transform functions, graphs, jobs, and monitoring information. The repository 104 also stores data objects that represent actual data to be processed by the computing system 100 including data stored in an external data store 112.

The parallel operating environment 106 accepts a specification of a data flow graph generated in the GDE 102 and generates computer instructions that correspond to the processing logic and resources defined by the graph. The parallel operating environment 106 then typically executes those instructions on a plurality of processors (which need not be homogeneous). A suitable parallel operating environment is the CO>OPERATING SYSTEM® available from the assignee of the present invention.

The User Interface module 108 provides a web-browser-based view of the contents of the repository 104. Using the User Interface module 108, a user may browse objects, create new objects, alter existing objects, specify application parameters, schedule jobs, etc. The User Interface module 108 generates forms-based browser screens for a user to search for and view objects and information about objects stored in the repository 104.

The executive 110 is an optional repository-based job scheduling system accessed through the User Interface module 108. The executive 110 maintains jobs and job queues as objects within the repository 104, and the User Interface module 108 provides a view of and facilities to manipulate jobs and job queues.

1.2 Metadata Analysis

The repository 104 stores metadata including data objects for graph-based applications including graph components and other functional objects for building computation graphs. Metadata stored in the repository 104 can also include, for example, "technical" metadata (e.g., application-related business rules, record formats, and execution statistics) and "enterprise" or "business" metadata (e.g., user-defined documentation of job functions, roles, and responsibilities).

The information stored in the repository 104 in the form of data objects enables various kinds of analysis about applications and the data processed by those applications. For example, a user can obtain answers to questions about data lineage (e.g., Where did a given value come from? How was the output value computed? Which applications produce and depend on this data?). A developer can understand the consequences of proposed modifications (e.g., If this piece changes, what else will be affected? If this source format changes, which applications will be affected?). A user/developer can also obtain questions to answers involving both technical metadata and business metadata (e.g., Which groups are responsible for producing and using this data? Who changed this application last? What changes did they make?).

The repository 104 is able to track the state of stored data. Data objects stored in the repository 104 are versioned, making it possible to examine the state of things as of last week, last month, or last year, and to compare it with the state of things today. The repository 104 collects job-tracking, or execution information which enables trend analysis (e.g., How fast is our data growing?) and capacity planning (e.g., How long did that application take to run? How much data did it process, and at what rate? What resources did the application consume? When will we need to add another server?).

A user can view (and optionally, edit) information contained in and/or associated with the stored data objects through the User Interface module 108. In one implementation, a user can define one or more "Views," which provide information about a relevant subset of the data objects in a Web page. A View is defined using a syntax for selecting one or more data objects based on relationships among those objects, as described in more detail below.

2 Data Model

2.1 Base Schema

Figure 2:
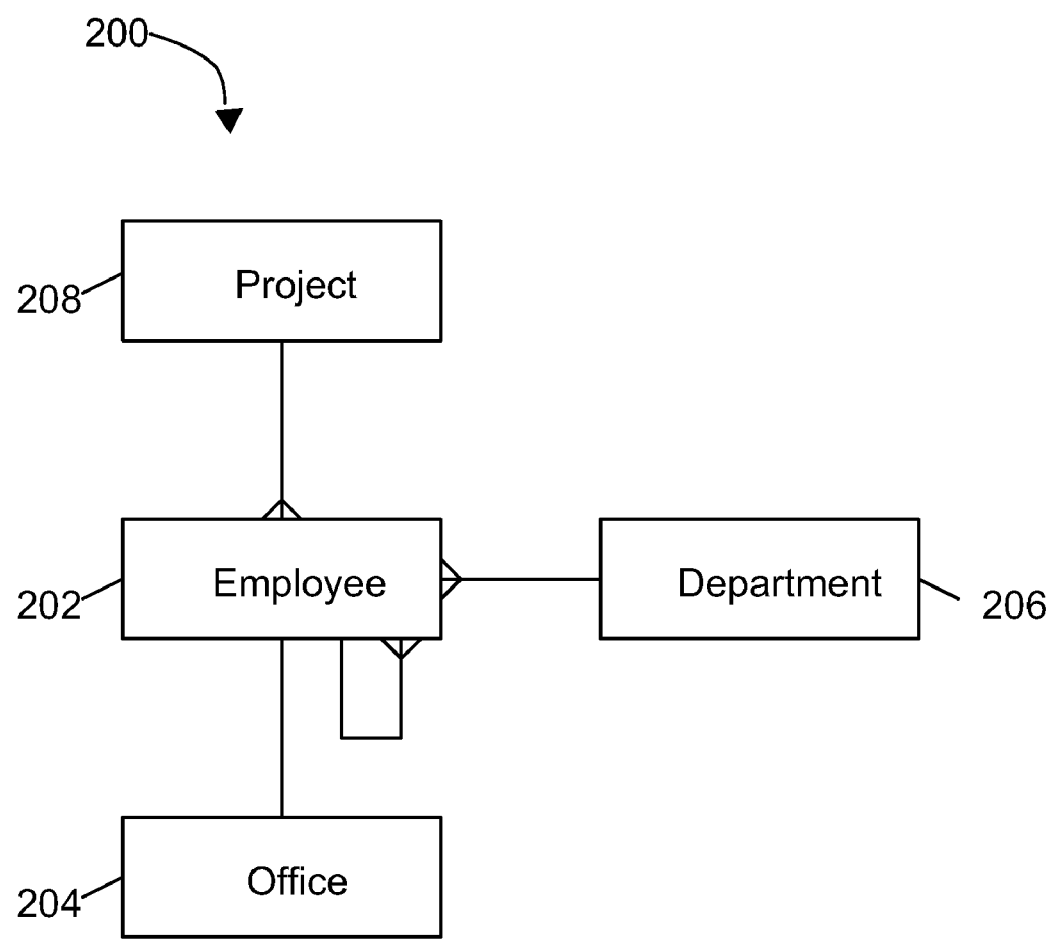
FIG. 2 is an entity-relationship diagram of an exemplary base schema.

FIG. 2 shows selected categories in a base schema 200 for metadata associated with a company, represented as an entity-relationship diagram. The base schema 200 defines the underlying relational structure of the metadata that is stored in the repository 104. The entity types in the base schema 200 are called "categories." Each category represents a class of data objects. Each category includes a set of "annotation rules." An annotation rule of a category is similar to a column definition of a table, as described in more detail below.

A user can extend the base schema 200 by adding user-defined categories. A user is able to add a "child" category based on an already existing "parent" category. The child category includes the annotation rules of the parent category and optionally includes further annotation rules specific to the child category.

Data objects can be stored in the repository 104 as members of a category. A data object that is a member of a category is similar to a row in a table. A member data object (e.g., a data structure that contains information about an employee) can be stored in a directory specified for that category (e.g., an "Employee" category). Alternatively, a member data object can be associated with a category through a reference within the data object. A data object that is a member of a category stores values associated with the annotation rules defined for that category.

One way to define a "relationship" between two data objects is through a "primary-key/foreign-key" relationship. A "primary-key" for a category is an annotation rule (or rules) whose value (or values taken together) uniquely identifies each data object in the category. A first data object has a primary-key/foreign-key relationship to a second data object (in a different category or in the same category) when the second data object has an annotation rule value that references a primary-key value of the first data object. This annotation rule for the second data object is called a "foreign-key."

Other techniques can be used to define a relationship between two data objects. For example, in some cases, in order to uniquely identify a parent data object, it may be necessary for a foreign-key to reference more than one annotation rule value of a primary-key. A primary-key that is made up of more than one annotation rule value is called a "composite-key."

The base schema 200 depicts potential relationships that can exist between data objects belonging to various categories. A line connecting two categories (or connecting a category to itself) represents the "connectivity" of potential relationships between data objects of the respective categories. The basic types of connectivity between categories are: one-to-one, one-to-many, and many-to-many.

A one-to-one connectivity exists when at most one data object in category A is related to one data object in category B. For example, an "Employee" category 202 represents employees in a company, with each data object in the category representing an employee. An "Office" category 204 represents occupied offices in a building, with each data object representing an office. If each employee is assigned their own office, the corresponding data objects would have a one-to-one foreign-key relationship. A one-to-one connectivity is depicted in FIG. 2 as a line.

A one-to-many connectivity exists when, for one data object in category A, there are zero, one, or many related data objects in category B, and for one data object in category B, there is one related data object in category A. For example, as above, the "Employee" category 202 represents employees in a company. A "Department" category 206 represents departments in the company. Each employee is related to one department, and each department is related to many employees. Therefore, the data objects corresponding respectively to "Department" and "Employee" have a one-to-many foreign-key relationship. A one-to-many connectivity is depicted in FIG. 2 as a line ending with a crow's foot.

A many-to-many connectivity exists when, for one data object in category A, there are zero, one, or many related data objects in category B, and for one data object in category B there are zero, one, or many related data objects in category A. For example, assume that employees can be assigned to any number of projects at the same time, and a project (a data object in the "Project" category 208) can have any number of employees assigned to it. Corresponding data objects from the "Employee" and "Project" categories would have a many-to-many foreign-key relationship. A many-to-many connectivity is depicted in FIG. 2 as a line beginning and ending with a crow's foot.

There can also be a relationship between objects in the same category. For example, data objects in the "Employee" category have a one-to-many relation relationship with other data objects in the "Employee" category. One employee can have a "supervised by" relationship with another employee represented by a one-to-many foreign-key relationship.

2.2 Annotation Rules

Annotation rules define various characteristics of values that can be associated with the data objects that are members of a given category. An annotation rule can be single-valued or multi-valued. Each annotation rule has a unique name by which it is identified. Multiple categories can have one or more annotation rules in common.

In one implementation there are four types of annotation rules that provide a user (e.g., an application developer) the ability to constrain the number and kinds (data types) of values that can be associated with a data object (e.g., by an end user). The four types of annotation rules are: string, choice, reference and record. The characteristics of the four types of annotation rules are as follows.

2.2.1 String-type

A string-type annotation rule associates a data object with one or more strings (e.g., an ASCII string). One or more strings are attached to the data object and associated with the name of the annotation rule. A string-type annotation rule that has one string value is single-valued. For example, an Employees data object can have a single-valued "Social Security number" string-type annotation rule, since an employee has one Social Security number. A string annotation rule that has more than one string value is multi-valued. For example, an Employees data object can have a multi-valued "phone number" string-type annotation rule, since an employee can have more than one phone number.

2.2.2 Choice-type

A choice-type annotation rule associates a data object with one or more values that are chosen by a user from a list of possible values. For example, a choice-type rule can be used when there is an expectation about the valid values that an annotation rule may have. For a single-valued choice-type annotation rule, an end user may only select one of a number of choices. An example of a single-valued choice-type annotation rule is a value that represents an answer to a question having only one of two possible answers: "yes" or "no."

For a multi-valued choice-type annotation rule, an end user may select any number of values from a list of possible values. For example, an employee might work in two departments: "Development" and "QA." A choice-type "Department" annotation rule would allow an end user to select the appropriate values from a list of departments: "Finance," "Development," "Operations," "Documentation", "QA," and "Executive."

By default, the list of possible values can be limited to a predefined list of values defined by a user. Alternatively, an end user is able to specify a value that is not in the predefined list of values. Optionally, when an end user specifies a value that is not in the list, the end user is able to add that value to the predefined list of values so that other end users can see that value as an option. Alternatively, the unlisted value can be saved in the repository 104, but not displayed as an option for other end users.

2.2.3 Reference-type

A reference-type annotation rule associates a first data object with one or more other data objects. The data object can be a member of the same category or of a different category as the first data object. A multi-valued reference-type annotation rule can refer to multiple data objects.

The reference-type annotation rule can be used to indicate primary-key/foreign-key relationships between data objects. The value of the reference-type annotation rule can be a foreign-key value that refers to a primary-key value of a data object in a different category. For example, an annotation rule of a data object in the "Employee" category includes a reference-type annotation rule "departmentKEY" that has a value that matches the value of a string-type annotation rule "key" that uniquely identifies a data object in the "Department" category. Thus, the unique object identifier "key" acts as a primary key.

Different types of relationships can exist between one data object and another data object. A data object can have multiple reference-type annotation rules that each represents a different relationship type. For example, a data object in the "Employee" category also includes a reference-type annotation rule "officeKEY" that has a value that matches the values of a string-type annotation rule "key" that uniquely identifies a data object in the "Office" category.

2.2.4 Record-type

A record-type annotation rule associates a data object with a set of annotation rule values from an object in another category. For example, the value of an "email_info" annotation rule of the "Employee" category includes all of the values of the annotation rules defined for an "Email Info" category (not shown). If a data object in the "Email Info" category has a string-type annotation rule "home_email" with a value of "joe@home.com" and a string-type annotation rule "work_email" with a value of "joe@work.com," then a data object in the "Employees" category can reference that data object to associate the values "joe@home.com" and "joe@home.com" with "email_info."

2.2.5 Examples

All of the defined categories can share a set of common annotation rules. For example, each category in the base schema 200 has 2 annotation rules in common: key, and name. Descriptions of these annotation rules are given below.

key: a string uniquely identifying each data object in the repository.

name: the name of the data object

Each category can also have annotation rules that are specific to that category. For example, some of the annotation rules for the categories "Employee" and "Department" in the base schema 200 are given below.

Annotation rules for the "Employee" category representing an employee in a company include:

start_date: the date on which the employee began employment.

name: the name of the employee.

gender: the gender of the employee "F" for female, "M" for male.

managed_byKEY: this value refers to the key value of another employee who is the employee's manager.

departmentKEY: this value refers to a key value for a member of the Department category representing the department in which the employee works.

email_info: represents email information for an employee.

projectKEY: this value refers to a key value for a member of the Project category representing a project to which the employee is assigned.

officeKEY: this value refers to a key value for a member of the Office category representing the office in which the employee works.

Annotation rules for the "Department" category representing a department within a company include:

name: refers to the name of the department.

location: refers to the location of the offices for the department.

3 Views

Figure 1B:
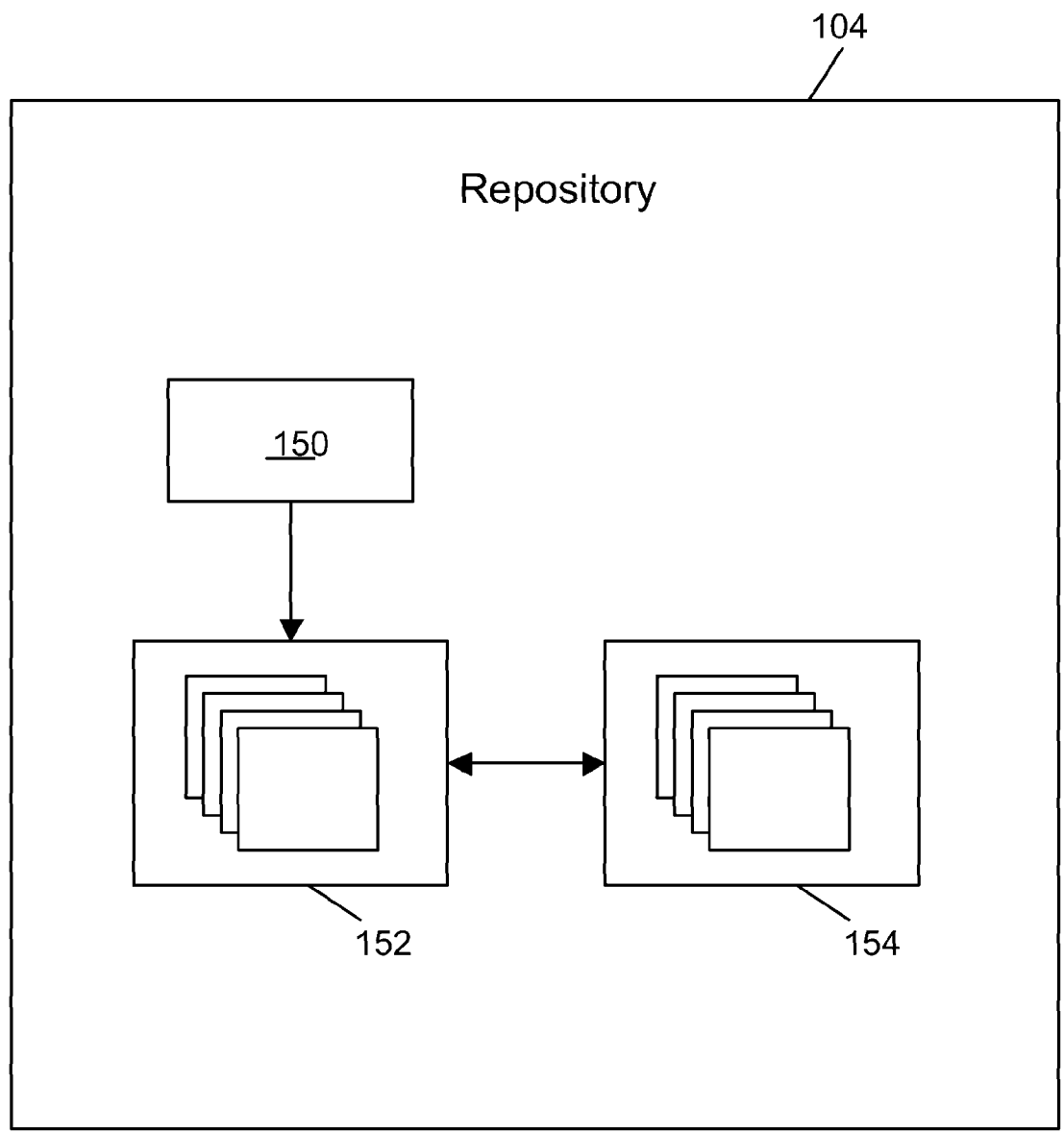
FIG. 1B is a block diagram of a metadata repository.

As introduced above, a user can view (and optionally, edit) metadata in the repository 104 using a user-defined View presented to the user in a Web browser through the User Interface module 108. Referring to FIG. 1B, the metadata repository 104 includes relational data 150 defining data object categories and annotation rules, data objects 152 that correspond to instances of the objects defined by relational data 150, and stored Views 154 that are defined by a user for accessing desired information contained in and/or associated with the data objects 152. The User Interface module 108 accesses the appropriate data objects from the repository 104 according to a View and renders an HTML page with the desired information (e.g., a label for a data object or a count of the number of data objects matching a specified criterion). Each View is associated with a category and includes one or more "View-elements" that define metadata to be rendered. Each View-element includes an element-descriptor that enables retrieval of metadata based on one or more data objects in the associated category or in a category that is related to the associated category through one or more primary-key/foreign-key relationships.

Figure 3:
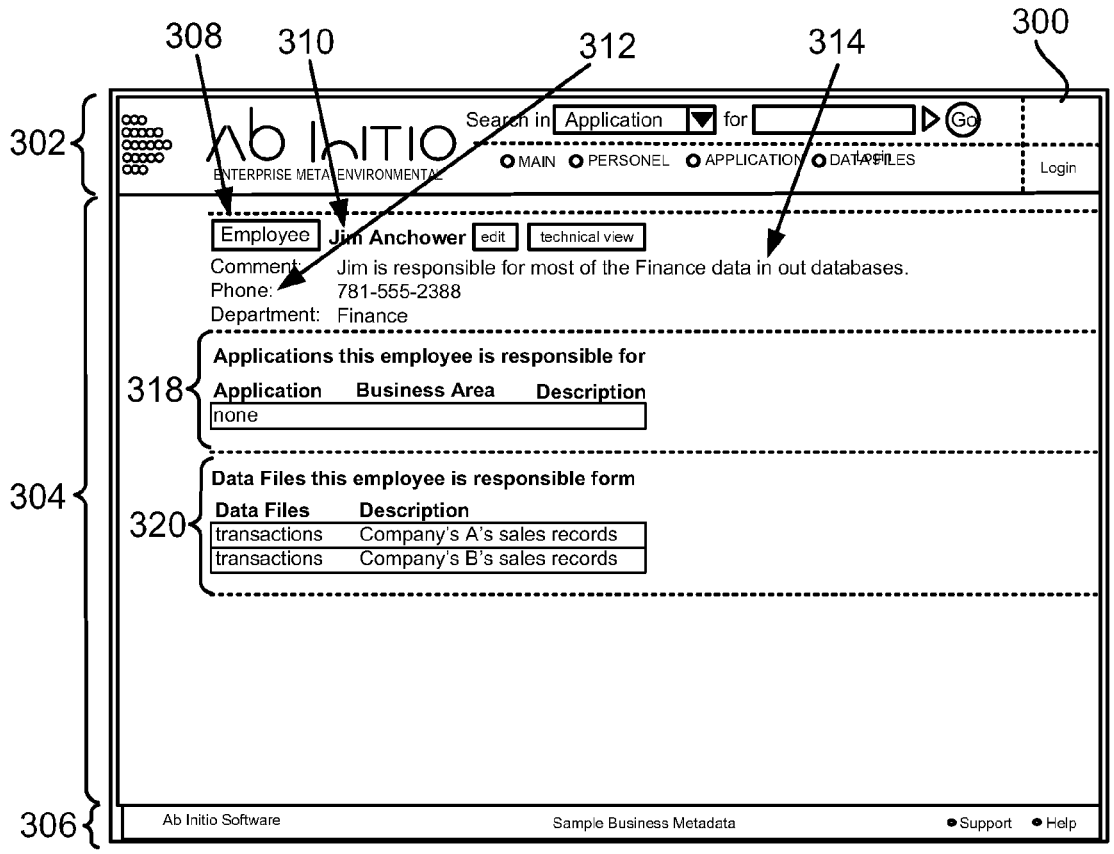
FIG. 3 is a rendered page for a View.

FIG. 3 shows an example of a rendered HTML page 300 for a View. The page 300 includes a header 302 that includes a navigation bar, a content section 304, and a footer 306. The content section 304 includes a name 308 of the category for which the View is defined (e.g., Employee) and a name 310 of a primary data object in the category with which the information in the View is associated. The content section 304 also includes information associated with the primary data object such as a user-defined label 312, and a value 314 of annotation rule for the primary data object. The page 300 also includes View-elements that are able to display information associated with other data objects related to the primary data object. In this example, the page 300 includes a View-element 318 that displays "Applications this employee is responsible for" (members of an "Applications" category), and a View-element 320 that displays "Data files this employee is responsible for" (members of a "Data Files" category).

There are three types of View-elements: simple, view, decorate. A simple-type View-element includes metadata based on annotation rule values of data objects in the associated category or in a category that is related to the associated category through one or more primary-key/foreign-key relationships. A view-type View-element includes metadata specified within a previously defined View for a category that is related to the associated category through one or more primary-key/foreign-key relationships. A decorate-type View-element includes text (e.g., an introduction to the Web page) to be rendered on the Web page for the View.

3.1 Specifying a View-element

The add-view-element command is used to define one or more view-elements and associate them with an existing View on a specified category. A user adds the view-elements in the order in which they are to be displayed in the User Interface module 108. The syntax for the command is: add-view-element category view element-type label element-descriptor element-view. The command arguments are defined as follows:

category: the name of an existing category.

view: the name of an existing View defined on category to which this View-element is to be added.

element-type: specifies one of: simple-type, view-type, or decorate-type.

label: text string that describes a metadata item. The text of the label is displayed in the rendered browser page, except for the label of a decorate-type View-element.

element-descriptor: describes the metadata to be retrieved (except for decorate-type).

element-view: (only used if element-type is view-type) the name of the View to be included.

3.2 Metadata Selection Actions

The User Interface module 108 provides a syntax for a user to specify an element-descriptor that enables the User Interface module 108 to retrieve the desired metadata.

The element-descriptor includes a composition of actions. The User Interface module 108 performs the composition of actions relative to a starting context that identifies a set of one or more data objects. For example, starting context may include a data object that is selected by a user through an on-screen link, or a starting context may include a set of data objects associated with a user-selected category.

The first action operates on this starting set of data object(s). Each subsequent action (if any) operates on the output returned from the preceding action. The output returned from an action can include a set of one or more data objects (e.g., in the form of primary-key values for the data objects), one or more values of annotation rules, or the results of a computation (e.g., a count of the number of data objects output form the preceding action). A returned set of one or more data objects and/or annotation rule values become a "starting set" for a subsequent action. Some types of actions such as "navigation actions" described below operate a starting set containing only on data objects.

The syntax for a composition of actions includes an action identifier (a keyword identifying the action) plus any arguments (some actions have no arguments). A sequence of action identifiers representing a corresponding composition of actions can optionally include a single action or multiple actions separated by a period (a "." symbol), for example: action1(<arguments>).action2(<arguments>).action3( )

3.2.1 Navigation Actions

A "stroll" is a composition of one or more "navigation actions" that represents a specification of navigating from a starting set of one or more data objects to a destination set of one or more data objects. Navigation actions include a walk action and an inv_walk action defined as:

walk(arule, cat): returns the data objects in category cat that are referenced by the annotation rule arule for each starting data object.

inv_walk (arule, cat): returns the data objects in category cat that have an annotation rule arule that references any member of the set of starting data objects.

For example, if the starting object is a manager and the desired data are the employees that report directly to that manager, the corresponding element-descriptor is the following stroll having a single navigation action:

inv_walk(managed_byKEY,Employee)

If the starting object is a project and the desired data are all the managers of employees working on that project, the corresponding element-descriptor is the following stroll having multiple navigation actions:

inv_walk(projectKEY,Employee).\
walk(managed_byKEY,Employee)

This example illustrates the use of the backslash (a "\" symbol) to indicate the continuation of an element-descriptor on a new line.

Some navigation actions navigate among data objects by performing a specified stroll recursively. For example, two recursive navigation actions are: gather_all and find_ultimate, described below.

gather_all (stroll): performs the navigation actions specified by stroll recursively and returns all the data objects found at each step of the recursion.

find_ultimate (stroll): performs the navigation actions specified by stroll recursively and returns all the "leaf node" data objects found at the end of the recursion (data objects for which the specified navigation actions return a null output).

3.2.2 Expression Actions

Some actions operate on a starting set using an "expression" similar to those used in scripting languages such as Python. The following are examples of expression actions that operate on a starting set of one or more starting data objects and/or annotation rule values.

sort (expr): returns the starting set sorted by the expression expr (e.g., a python expression).

rsort (expr): returns the starting set sorted in reverse order by the expression expr.

filter (expr): filters the starting set by the expression expr.

eval (expr): evaluates the expression expr on the starting set.

avg (expr): returns the average of the expression expr over the starting set.

Other actions operate on a starting set without any arguments. For example:

count( ): returns the number of items in the starting set.

In addition to syntax such as standard Python syntax, an expression can include functional syntax (e.g., keywords) that can perform functions on the starting set. The following are examples of such functional syntax.

The keyword ann is combined with an annotation rule arule as ann.arule to return values of the annotation rule arule. For example, ann.key occurring in an expression expr returns the value of the key annotation rule of a data object to which the expression applies. In another example, for a set of data objects that are members of the Employee category, the following element-descriptor returns the employees that are female: filter(ann.gender="F").

The keyword position occurring in an expression applied to each item in a starting set returns the position of each item within an ordered list of items in the starting set. For example, the following element-descriptor returns the five most senior employees from the starting set:

sort(ann.start_date).filter(position<5)

First, the sort action arranges the start dates, a list of values, in ascending order. Finally, the filter action applies the expression 'position<5' to the list of values returned by sort and returns the first five values (in positions 0 to 4).

The keyword look_ahead provides the ability to filter based on data objects that are not directly available in a starting set. The expression look_ahead(stroll) included within a filter action applies the navigation actions in stroll to each data object in the starting set and returns a set of data objects that can be used to filter the data objects in the starting set. If a filter action contains only the look_ahead(stroll) expression, then a starting data object in the starting set is filtered based on whether the navigation actions in stroll return any data objects from that starting data object. If so, the filter returns the starting data object. If not, the filter does not return ("filters out") the starting data object.

For example, a view for the "Employee" category may include information about employees' managers. To filter based on information about an employee's manager, a filter would use the keyword look_ahead to see information about the employee's managers. An element-descriptor describing the set of all employees who have at least two levels of management above them would be:

filter(look_ahead(walk(managed_byKEY, Employee).\
walk(managed_byKEY, Employee).count( ))>0)

4 EXAMPLES

Several example are given below that show construction of an element-despriptor for retrieving desired information for a View.

4.1 Example 1

An element-descriptor for retrieving the number of employees in an employee's department starting from a context including the employee is:

walk(departmentKEY, Department).inv_walk(departmentKEY, Employee).count( )

The walk navigation action finds the Department object that includes this employee. The inv_walk navigation action then finds all Employees who are in that Department. Then the count action finds the number of such graphs.

4.2 Example 2

In the following example, the navigation finds the most senior employee in a the Department given in the starting context.:

inv_walk(departmentKEY, Employee).sort(ann.start_date).\
filter(position<1)

The inv_walk navigation action follows the departmentKEY annotation rule backward to all employees in that department. Then the rsort action reverse sorts these employees by their start date—from oldest to most recent. Then the filter action acts on the sorted list of employees, selecting only the first object in the list. The result is the most senior employee in the department.

4.3 Example 3

In the following example, the navigation finds the most senior female employee in the starting department:

inv_walk(departmentKEY, Employee).\
filter(ann.gender=="F").\
sort(ann.start_date).filter(position<1)

This example includes an additional filter action. After finding all the employees in the department, the first filter action selects the female employees. Then sort performs a reverse sort on the list of female employees—arranging the employees from most senior to most recent. Operating on the sorted female employees, the second filter action discards all but the most senior employee.

4.4 Example 4

In some cases obtaining desired information includes filtering on a value that is not directly available in a given context for an element-descriptor. For example, given a set of employees, a list of the managers of those employees may be desired. Information such as the gender of the managers can be obtained from these manager data objects. To support these kinds of queries, the filter action can be used with the keyword look_ahead as described above. The following exemplary element-descriptor uses a filter action with the look_ahead keyword from a starting context including all employees to find the employees whose managers are male:

filter(look_ahead(walk(managed_byKEY, Employee).\
filter(ann.gender=="M")))

The set of employees is filtered using the look_ahead keyword. The stroll passed into look_ahead describes a series of one or more navigation actions that can be used to reach the data object(s) of interest. In this case, a first walk action in the stroll follows the employee data object's managed_byKEY annotation rule. The next walk action filters these objects by the value of the gender annotation rule. If the employees' managers are not male, they are filtered out of the result set.

4.5 Example 5

An element-descriptor for retrieving all employees whose gender is different from their managers' is:

filter(look_ahead(walk(managed_byKEY, Employee).\
filter(ann.gender=="M"))).filter(ann.gender=="F")+
filter(look_ahead(walk(managed_byKEY, Employee).\
filter(ann.gender=="F"))).filter(ann.gender=="M")

In this example, the "+" symbol aggregates the results of multiple strolls. The first stroll is similar to Example 4, but the set of all employees whose managers are male is further filtered to return only the female employees in the set. The second stroll finds all employees whose managers are female, then filters this set to return only the employees that are male.

4.6 Example 6

In some situations, it may be desirable to see the results of a walk that is performed recursively. For example, it might be desirable to see not only a manager's direct reports, but also his direct reports' direct reports, and so on ad infinitum. An element-descriptor can obtain this information using the gather_all navigation action:

gather_all(inv_walk(managed_byKEY, Employee))

In this example, the stroll is from a set of employees to all the employees managed by them. The gather_all action causes this stroll to be performed recursively, so that the answer set is the set of all employees "below" the starting set of employees in the company hierarchy.

Implementation Approaches

The data object management techniques described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a medium, such as a CD-ROM, readable by a general or special purpose programmable computer or delivered (encoded in a propagated signal) over a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

It is to be understood that the foregoing description is intended to illustrate and not to limit the scope of the invention, which is defined by the scope of the appended claims. Other embodiments are within the scope of the following claims.

What is claimed is:

1. A computer-implemented method of determining information related to a first set of one or more data objects of a plurality of data objects in a database, including:
 receiving data that specifies a composition of a plurality of actions, the composition including a specification of a first navigation action and a specification of a filter action that includes a specification of a second navigation action, wherein the specification of each navigation action includes a first value that specifies a relationship between different data objects and a second value that specifies a relationship type of a plurality of relationship types;
 determining the information related to the first set of one or more data objects by applying the composition of the plurality of actions to the first set of one or more data objects, including:
  applying the filter action to produce an intermediate set of one or more data objects from the first set of one or more data objects wherein the intermediate set of one or more data objects includes each data object in the first set of one or more data objects for which applying the second navigation action to the data object produces one or more result data objects and the intermediate set of one or more data objects does not include each data object in the first set of one or more data objects for which applying the second navigation action to the data object produces no result data objects;
applying the first navigation action to the intermediate set of one or more data objects to generate a final set of one or more data objects; and
determining the information related to the first set of one or more data objects based on the final set of one or more data objects;
presenting to a user a result based on the information related to the first set of one or more data objects;
wherein applying the composition of the plurality of actions includes recursive application of at least one of the first navigation action and the second navigation action; and
accepting a specification of a visual representation of information about one or more of the plurality of data objects in the database, the specification of the visual representation of information including the specification of the composition of the plurality of actions;
wherein presenting to the user the result based on the information related to the first set of one or more data objects includes presenting to the user the visual representation including the information related to the first set of one or more data objects; and
wherein the specification of the first navigation action includes a function whose arguments include a category of data objects as the second value and a name of an annotation rule specifying the relationship as the first value.

2. The method of claim 1, wherein recursive application of at least one of the first navigation action and a third navigation action includes recursive application of a composition of navigation actions that includes the first navigation action and the third navigation action.

3. The method of claim 1, wherein applying the composition of the plurality of actions further includes identifying data objects found in the recursive application of at least one of the first navigation action and a third navigation action.

4. The method of claim 1, wherein applying the composition of the plurality of actions further includes identifying data objects found at an end of the recursive application of at least one of the first navigation action and a third navigation action.

5. The method of claim 1, wherein the plurality of relationship types correspond to a plurality of categories of data objects.

6. The method of claim 5, wherein the relationship identifies a value associated with a first data object that refers to a value associated with a second data object and the relationship type corresponds to a category of data objects returned by the first navigation action.

7. The method of claim 6, wherein the first data object is in a first category and the second data object is in a second category.

8. The method of claim 6, wherein the value associated with the first data object is a foreign-key and the value associated with the second data object is a primary-key.

9. A computer-implemented method of determining information related to a first set of one or more data objects of a plurality of data objects in a database, including:
receiving data that specifies a composition of a plurality of actions, the composition including a specification of a first navigation action, a specification of a functional action, and a specification of a filter action that includes a specification of a second navigation action, wherein the specification of each navigation action includes a first value that specifies a relationship between different data objects and a second value that specifies a relationship type of a plurality of relationship types;
determining the information related to the first set of one or more data objects by applying the composition of the plurality of actions to the first set of one or more data objects, including:
applying the filter action to produce an intermediate set of one or more data objects from the first set of one or more data objects wherein the intermediate set of one or more data objects includes each data object in the first set of one or more data objects for which applying the second navigation action to the data object produces one or more result data objects and the intermediate set of one or more data objects does not include each data object in the first set of one or more data objects for which applying the second navigation action to the data object produces no result data objects;
applying the first navigation action to the intermediate set of one or more data objects to generate a second intermediate set of one or more data objects that are related to the intermediate set of one or more data objects according to a relationship determined from the first value and the second value;
applying the functional action that performs a first function based on values associated with the second intermediate set of one or more data objects, wherein each value represents an attribute of the associated data object to generate a final set of one or more data objects; and
determining the information related to the first set of one or more data objects based on the final set of one or more data objects;
presenting to a user a result based on the information related to the first set of one or more data objects; and
accepting a specification of a visual representation of information about one or more of the plurality of data objects in the database, the specification of the visual representation of information including the specification of the composition of the plurality of actions;
wherein presenting to the user the result based on the information related to the first set of one or more data objects includes presenting to the user the visual representation including the information related to the first set of one or more data objects; and
wherein the specification of the first navigation action includes a second function whose arguments include a category of data objects as the second value and a name of an annotation rule specifying the relationship as the first value.

10. The method of claim 9, wherein the first function includes filtering the second intermediate set of one or more data objects based on the values associated with the second intermediate set of one or more data objects to generate a subset of the second intermediate set of one or more data objects.

11. The method of claim 9, wherein the first function includes sorting the second intermediate set of one or more data objects.

12. The method of claim 9, wherein the first function includes an arithmetic function of at least some of the values associated with the second intermediate set of one or more data objects.

13. The method of claim 9, wherein the first function includes a logical function of at least some of the values associated with the second intermediate set of one or more data objects.

14. The method of claim 9, wherein the plurality of relationship types correspond to a plurality of categories of data objects.

15. The method of claim 14, wherein the relationship identifies a value associated with a first data object that refers to a value associated with a second data object and the relationship type corresponds to a category of data objects returned by the first navigation action.

16. The method of claim 15, wherein the first data object is in a first category and the second data object is in a second category.

17. The method of claim 15, wherein the value associated with the first data object is a foreign-key and the value associated with the second data object is a primary-key.

18. A computer-readable storage medium storing a computer program for determining information related to a first set of one or more data objects of a plurality of data objects in a database, the computer program having instructions that when executed by a processor of a computer system cause the computer system to:
receive data that specifies a composition of a plurality of actions, the composition including a specification of a first navigation action and a specification of a filter action that includes a specification of a second navigation action, wherein the specification of each navigation action includes a first value that specifies a relationship between different data objects and a second value that specifies a relationship type of a plurality of relationship types; and
determine the information related to the first set of one or more data objects by applying the composition of the plurality of actions to the first set of one or more data objects, including:
applying the filter action to produce an intermediate set of one or more data objects from the first set of one or more data objects wherein the intermediate set of one or more data objects includes each data object in the first set of one or more data objects for which applying the second navigation action to the data object produces one or more result data objects and the intermediate set of one or more data objects does not include each data object in the first set of one or more data objects for which applying the second navigation action to the data object produces no result data objects;
applying the first navigation action to the intermediate set of one or more data objects to generate a final set of one or more data objects; and
determining the information related to the first set of one or more data objects based on the final set of one or more data objects;
present to a user a result based on the information related to the first set of one or more data objects;
wherein applying the composition of the plurality of actions includes recursive application of at least one of the first navigation action and the second navigation action; and
accept a specification of a visual representation of information about one or more of the plurality of data objects in the database, the specification of the visual representation of information including the specification of the composition of the plurality of actions;
wherein presenting to the user the result based on the information related to the first set of one or more data objects includes presenting to the user the visual representation including the information related to the first set of one or more data objects; and
wherein the specification of the first navigation action includes a function whose arguments include a category of data objects as the second value and a name of an annotation rule specifying the relationship as the first value.

19. The computer-readable storage medium of claim 18, wherein recursive application of at least one of the first navigation action and a third navigation action includes recursive application of a composition of navigation actions that includes the first navigation action and the third navigation action.

20. A computer-readable storage medium storing a computer program for determining information related to a first set of one or more data objects of a plurality of data objects in a database, the computer program having instructions that when executed by a processor of a computer system cause the computer system to:
receive data that specifies a composition of a plurality of actions, the composition including a specification of a first navigation action, a specification of a functional action, and a specification of a filter action that includes a second navigation action, wherein the specification of each navigation action includes a first value that specifies a relationship between different data objects and a second value that specifies a relationship type of a plurality of relationship types;
determine the information related to the first set of one or more data objects by applying the composition of the plurality of actions to the first set of one or more data objects, including:
applying the filter action to produce an intermediate set of one or more data objects from the first set of one or more data objects wherein the intermediate set of one or more data objects includes each data object in the first set of one or more data objects for which applying the second navigation action to the data object produces one or more result data objects and the intermediate set of one or more data objects does not include each data object in the first set of one or more data objects for which applying the second navigation action to the data object produces no result data objects;
applying the first navigation action to the intermediate set of one or more data objects to generate a second intermediate set of one or more data objects that are related to the intermediate set of one or more data objects according to a relationship determined from the first value and the second value;
applying the functional action that performs a first function based on values associated with the second intermediate set of one or more data objects, wherein each value represents an attribute of the associated data object to generate a final set of one or more data objects; and
determining the information related to the first set of one or more data objects based on the final set of one or more data objects;
present to a user a result based on the information related to the first set of one or more data objects; and
accept a specification of a visual representation of information about one or more of the plurality of data objects in the database, the specification of the visual representation of information including the specification of the composition of the plurality of actions;

wherein presenting to the user the result based on the information related to the first set of one or more data objects includes presenting to the user the visual representation including the information related to the first set of one or more data objects; and wherein the specification of the first navigation action includes a second function whose arguments include a category of data objects as the second value and a name of an annotation rule specifying the relationship as the first value.

21. The computer-readable storage medium of claim 20, wherein the first function includes filtering the second intermediate set of one or more data objects based on the values associated with the second intermediate set of one or more data objects to generate a subset of the second intermediate set of one or more data objects.

22. The computer-readable storage medium of claim 20, wherein the first function includes sorting the second intermediate set of one or more data objects.

23. The computer-readable storage medium of claim 20, wherein the first function includes an arithmetic function of at least some of the values associated with the second intermediate set of one or more data objects.

24. The computer-readable storage medium of claim 20, wherein the first function includes a logical function of at least some of the values associated with the second intermediate set of one or more data objects.

25. A computer system for determining information related to a first set of one or more data objects of a plurality of data objects in a database, including:
a repository including a computer-readable storage medium storing the plurality of data objects; and
at least one processor coupled to the repository, the processor configured to:
receive data that specifies a composition of a plurality of actions, the composition including a specification of a first navigation action and a specification of a filter action that includes a specification of a second navigation action, wherein the specification of each navigation action includes a first value that specifies a relationship between different data objects and a second value that specifies a relationship type of a plurality of relationship types;
determine, using the computer system, the information related to the first set of one or more data objects by applying the composition of the plurality of actions to the first set of one or more data objects, including:
applying the filter action to produce an intermediate set of one or more data objects from the first set of one or more data objects wherein the intermediate set of one or more data objects includes each data object in the first set of one or more data objects for which applying the second navigation action to the data object produces one or more result data objects and the intermediate set of one or more data objects does not include each data object in the first set of one or more data objects for which applying the second navigation action to the data object produces no result data objects;
applying the first navigation action to the intermediate set of one or more data objects to generate a final set of one or more data objects; and
determining the information related to the first set of one or more data objects based on the final set of one or more data objects;

present to a user a result based on the information related to the first set of one or more data objects;

wherein applying the composition of the plurality of actions includes recursive application of at least one of the first navigation action and the second navigation action; and accept a specification of a visual representation of information about one or more of the plurality of data objects in the database, the specification of the visual representation of information including the specification of the composition of the plurality of actions;

wherein presenting to the user the result based on the information related to the first set of one or more data objects includes presenting to the user the visual representation including the information related to the first set of one or more data objects; and wherein the specification of the first navigation action includes a function whose arguments include a category of data objects as the second value and a name of an annotation rule specifying the relationship as the first value.

26. The system of claim 25, wherein recursive application of at least one of the first navigation action and a third navigation action includes recursive application of a composition of navigation actions that includes the first navigation action and the third navigation action.

27. A computer system for determining information related to a first set of one or more data objects of a plurality of data objects in a database, including:
a repository including a computer-readable storage medium storing the plurality of data objects; and
at least one processor coupled to the repository, the processor configured to:
receive data that specifies a composition of a plurality of actions, the composition including a specification of a first navigation action, a specification of a functional action, and a specification of a filter action that includes a specification of a second navigation action, wherein the specification of each navigation action includes a first value that specifies a relationship between different data objects and a second value that specifies a relationship type of a plurality of relationship types;
determine, using the computer system, the information related to the first set of one or more data objects by applying the composition of the plurality of actions to the first set of one or more data objects, including:
applying the filter action to produce an intermediate set of one or more data objects from the first set of one or more data objects wherein the intermediate set of one or more data objects includes each data object in the first set of one or more data objects for which applying the second navigation action to the data object produces one or more result data objects and the intermediate set of one or more data objects does not include each data object in the first set of one or more data objects for which applying the second navigation action to the data object produces no result data objects;
applying the first navigation action to the intermediate set of one or more data objects to generate a second intermediate set of one or more data objects that are related to the intermediate set of one or more data objects according to a relationship determined from the first value and the second value;
applying the functional action that performs a first function based on values associated with the second intermediate set of one or more data objects, wherein each value represents an attribute of the associated data object to generate a final set of one or more data objects; and determining the information related to the first set of one or more data objects based on the final set of one or more data objects;

present to a user a result based on the information related to the first set of one or more data objects; and accept a specification of a visual representation of information about one or more of the plurality of data objects in the database, the specification of the visual representation of information including the specification of the composition of the plurality of actions;

wherein presenting to the user the result based on the information related to the first set of one or more data objects includes presenting to the user the visual representation including the information related to the first set of one or more data objects; and wherein the specification of the first navigation action includes a second function whose arguments include a category of data objects as the second value and a name of an annotation rule specifying the relationship as the first value.

28. The system of claim 27, wherein the first function includes filtering the second intermediate set of one or more data objects based on the values associated with the second intermediate set of one or more data objects to generate a subset of the second intermediate set of one or more data objects.

29. The system of claim 27, wherein the first function includes sorting the second intermediate set of one or more data objects.

30. The system of claim 27, wherein the first function includes an arithmetic function of at least some of the values associated with the second intermediate set of one or more data objects.

31. The system of claim 27, wherein the first function includes a logical function of at least some of the values associated with the second intermediate set of one or more data objects.

* * * * *